United States Patent [19]

Eckle

[11] Patent Number: 4,793,750
[45] Date of Patent: Dec. 27, 1988

[54] PRECISION ADJUSTMENT FOR A MACHINE TOOL, ESPECIALLY A BORING MACHINE OR THE LIKE

[75] Inventor: Otto Eckle, Loechgau, Fed. Rep. of Germany

[73] Assignee: Komet Stahlhalter-und Werkzeugfabrik Robert Breuning GmbH, Besigheim, Fed. Rep. of Germany

[21] Appl. No.: 98,063

[22] Filed: Sep. 17, 1987

[30] Foreign Application Priority Data

Oct. 16, 1986 [DE] Fed. Rep. of Germany ....... 3635228

[51] Int. Cl.$^4$ .......................... B23Q 3/12; B23B 39/00
[52] U.S. Cl. ..................................... 409/231; 408/158; 408/161; 408/168
[58] Field of Search ...... 408/153, 158, 161, 168, 169, 408/170, 171; 409/231, 232

[56] References Cited

U.S. PATENT DOCUMENTS 2,826,943  3/1958  Townsend ........................... 408/158
4,508,475  4/1985  Peuterbaugh ....................... 408/158

FOREIGN PATENT DOCUMENTS 7409979  6/1974  Fed. Rep. of Germany.
743904  4/1933  France ............................... 408/169

Primary Examiner—Gil Weidenfeld
Assistant Examiner—Daniel W. Howell
Attorney, Agent, or Firm—Flynn, Thiel, Boutell & Tanis

[57] ABSTRACT

In a precision adjustment head for a machine tool a slide (9) is radially adjustable in a radially extending guide (8) in a substantially cylindrical housing (1), on which slide a tool carrier (11) can be fixed. In the housing (1) the positioning member 5 is axially displaceable and a positioning element (14) is fixed to the slide (9), with a groove (15) extending obliquely to the housing axis A and tapering to its groove bottom (15a), in which engages a projecting insert (19) provided on the positioning member (5), tapering towards its free end in correspondence with the groove cross section. The insert (19) is adjustable and fixable relative to the positioning member (5) perpendicular to the groove bottom (15a).

17 Claims, 5 Drawing Sheets

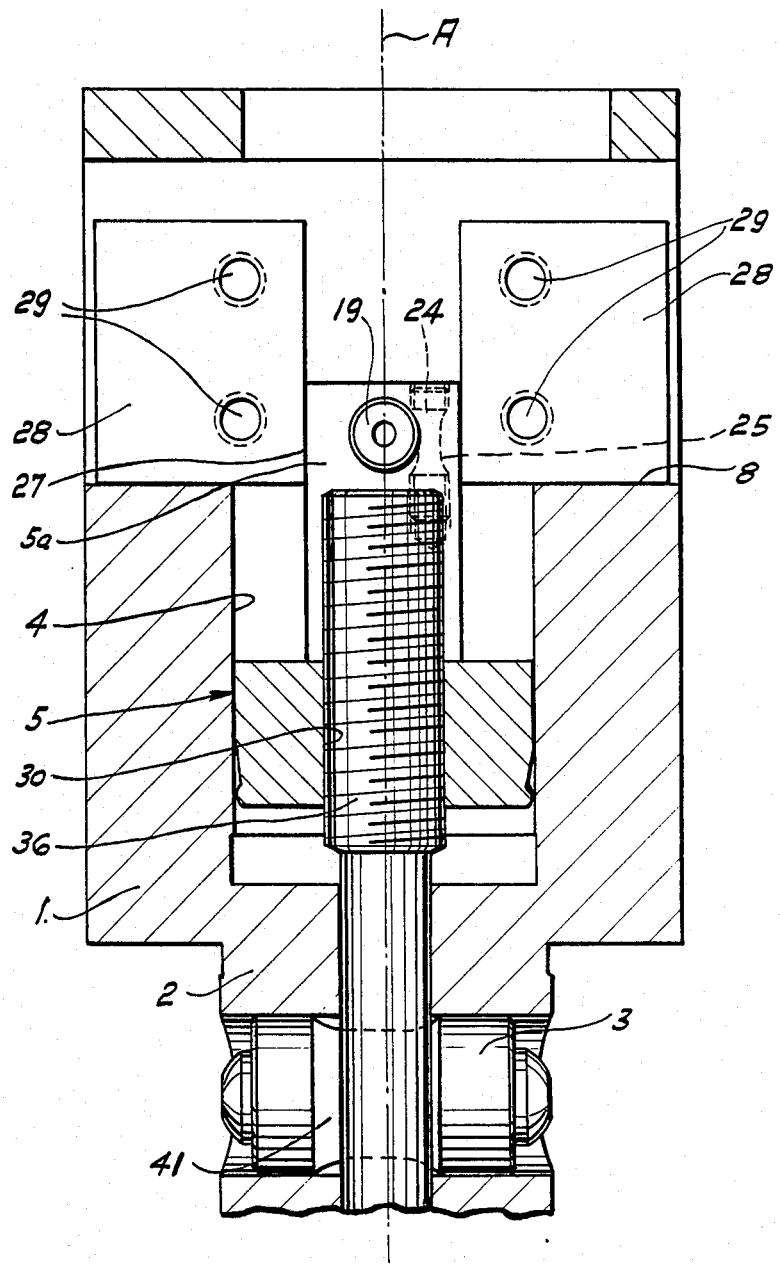

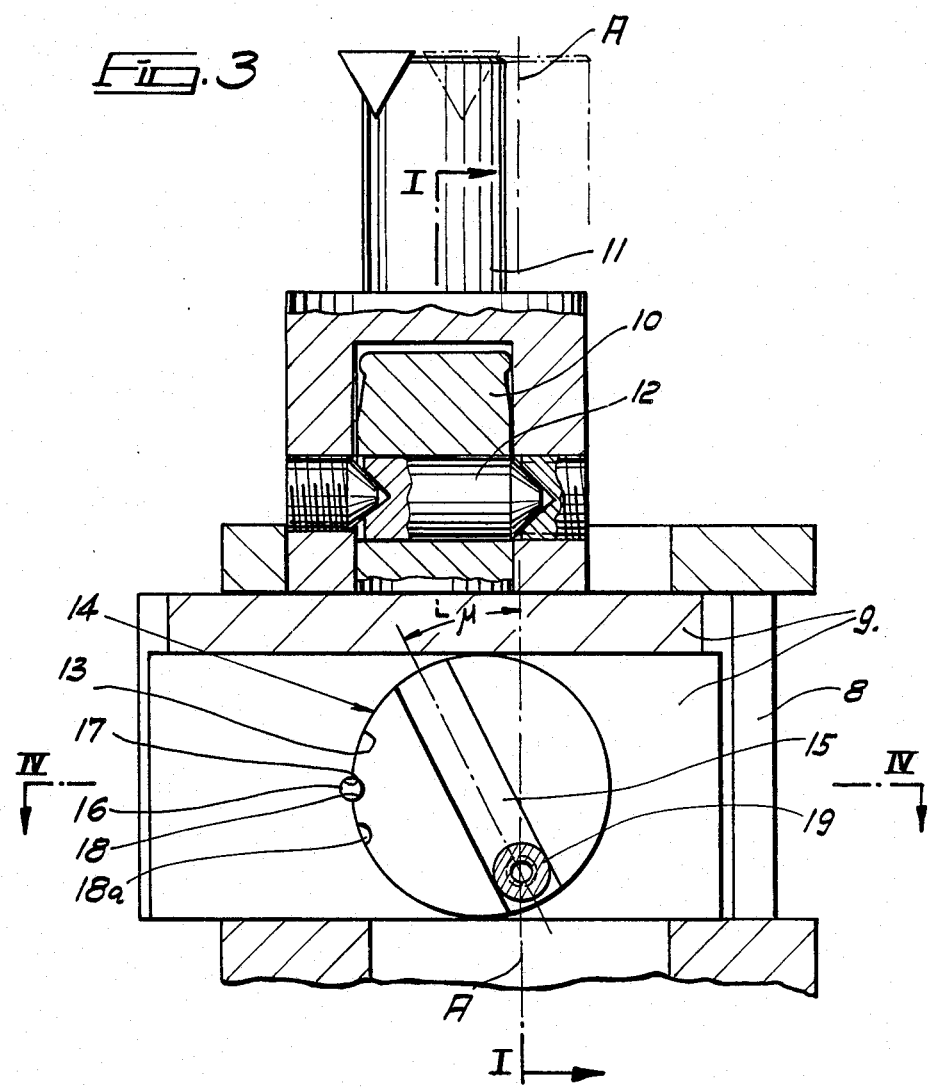

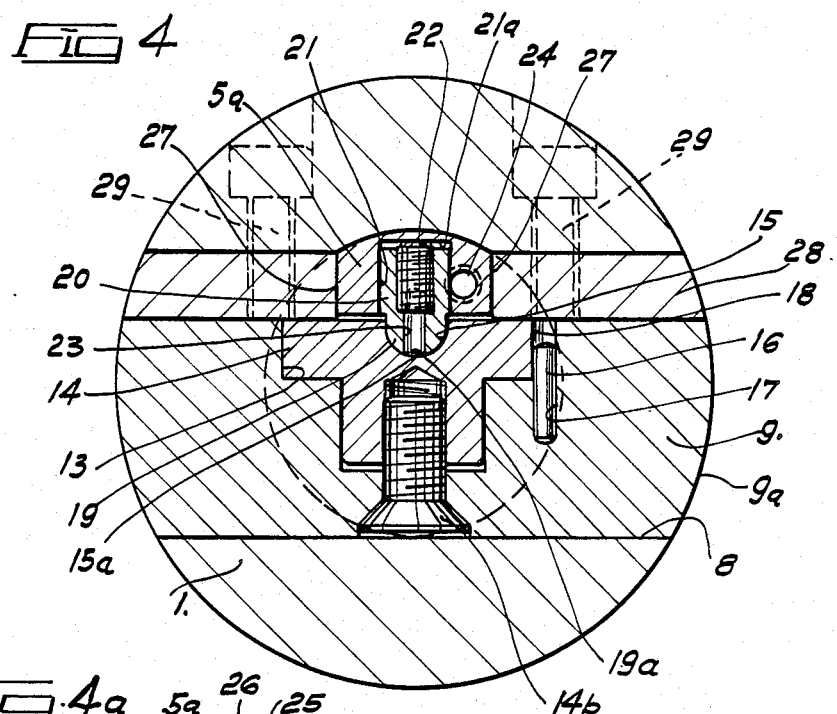
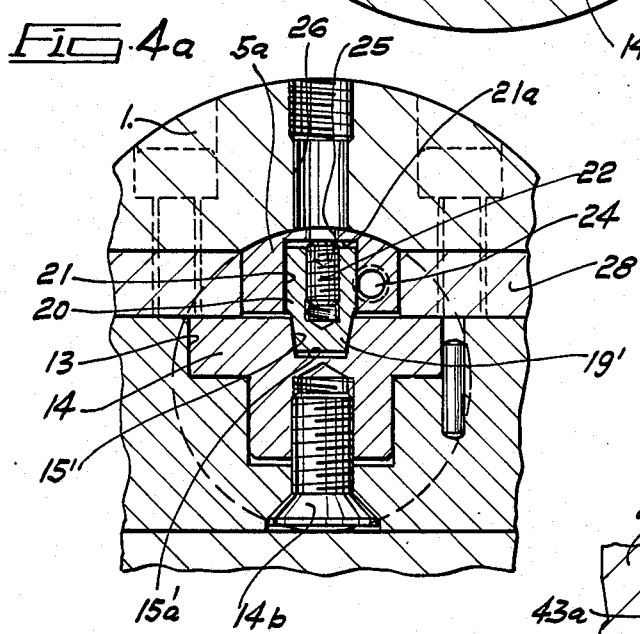
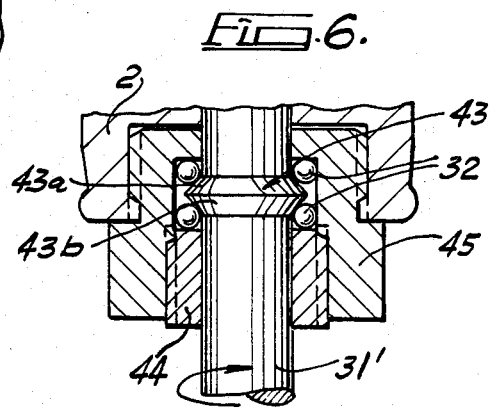

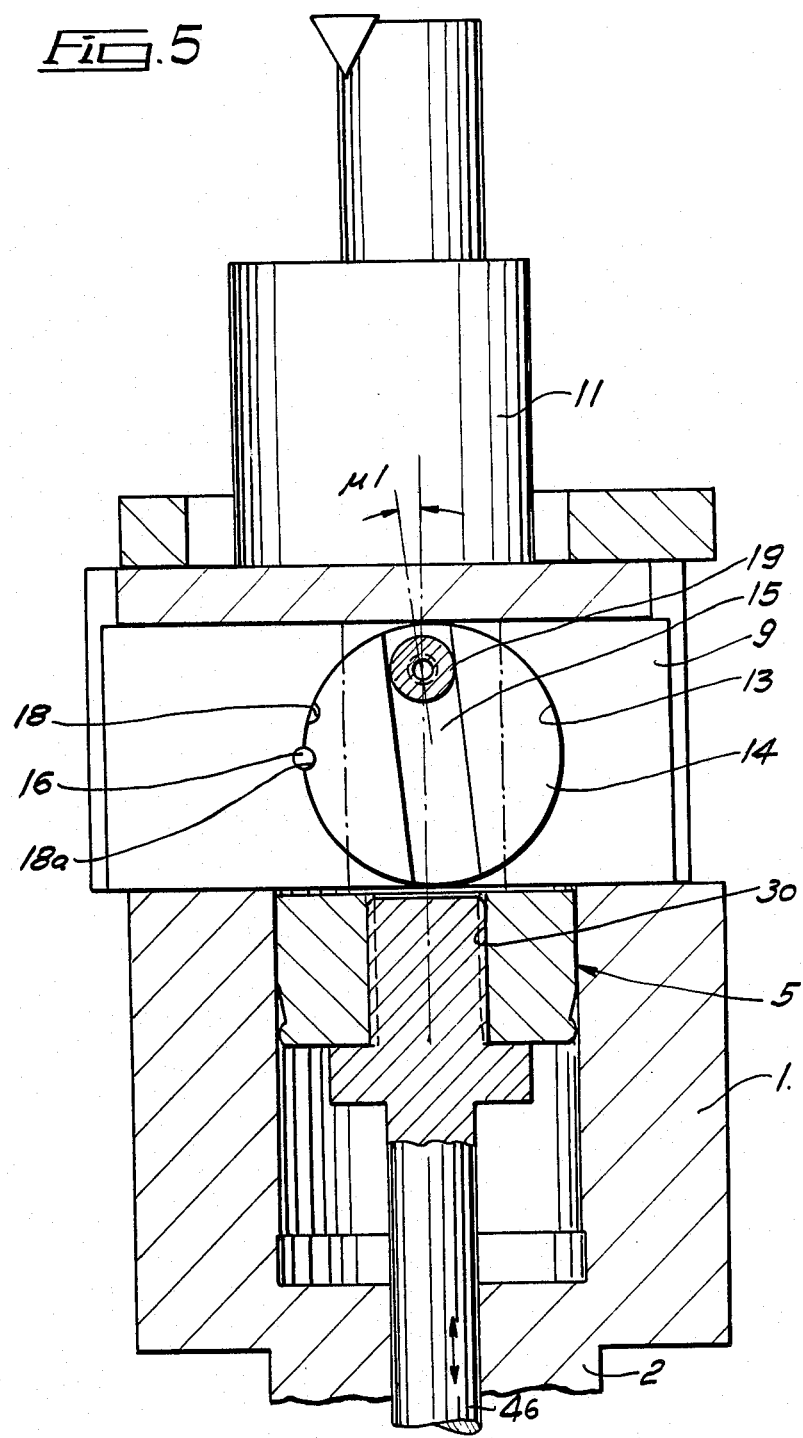

PRECISION ADJUSTMENT FOR A MACHINE TOOL, ESPECIALLY A BORING MACHINE OR THE LIKE

FIELD OF THE INVENTION

This invention relates to a precision adjustment head for a machine tool, especially a boring machine or the like, with a substantially cylindrical housing which can be connected to the spindle of a machine tool, a slide radially displaceable in a radially extending guide of the housing, on which a tool carrier can be fixed, a positioning member axially displaceable in the housing and a positioning element fixed to the slide, which comprises a groove running obliquely to the housing axis and tapering into the base of the groove, in which there engages a projecting insert provided on the positioning member and tapering at its free end in correspondence with the cross section of the groove.

BACKGROUND OF THE INVENTION

In one such known precision adjustment head (DE-GM 7 409 979), an axially displaceable positioning rod is provided in the housing, which carries an oblique toothing as the positioning member. This engages in a corresponding oblique toothing provided on the slide. However, as a result of manufacturing tolerances, play arises between the two oblique toothings, which influences the positioning accuracy of the slide. For operations requiring the highest accuracy, this known adjustment head is accordingly not suitable. In this connection it is to be noted that precision adjustment heads with automatically operable slides are required in order to be able to work programmed working diameters of various sizes, also however for automatic cutting correction. Thus, in an automatic machining, the final working diameter of work pieces can be automatically, supplementarily controlled. If the ascertained diameter measurement lies outside the predetermined tolerances, which can arise for example from cutter wear or an early raising of the cutter from the workpiece surface, then the tool must be adjustable automatically and without stopping the machine to the correct working diameter with the highest accuracy.

The invention is therefore based on the problem of providing a precision adjustment head of the above mentioned kind, for a machine tool, especially a boring machine or the like, in which the axial movement of the positioning member is converted in simple manner, without play, into a radial movement of the slide, and which is accordingly characterised by the highest working accuracy.

This is attained according to the invention in that the insert is adjustable and lockable on the positioning member, perpendicular to the groove bottom.

By means of adjustment of the insert perpendicular to the groove bottom there is obtained a play free abutment of its abutment surfaces tapering towards the groove bottom against the flank surfaces of the groove. This play-free abutment can be attained by virtue of the adjustability of the insert even with less tight manufacturing tolerances. By virtue of the complete freedom of play between the positioning member and the positioning element, the precision adjustment head has a very high working accuracy.

A particularly advantageous development of the invention consists in that the positioning element is a disc in whose front face the groove is worked, which is recessed into a recess of the slide and can be fixed in a predetermined angular position with respect to the slide. By virtue of this development it is possible to alter the transmission ratio between the positioning member and the positioning element and, in this manner, adapt the fine adjustment head to the current required working accuracy.

If for example the disc is so set that its groove is inclined at an angle of 26°34' with respect to the housing axis, an axial adjustment of the positioning member of 1 mm will then move the slide by 0.5 mm and accordingly lead to an alteration of the working diameter of 1 mm.

On the other hand, if the disc is so adjusted that its groove is inclined at an angle of 2°52' with respect to the housing axis, then an adjustment of the positioning member of 1 mm in the axial direction yields a radial adjustment of the slide of 0.05 mm and thereby an alteration of the working diameter of 0.1 mm.

BRIEF DESCRIPTION OF THE DRAWINGS

The invention is explained below in more detail with reference to the embodiments shown in the drawings. These show:

FIG. 2 an axial section on the line II—II of FIG. 2 with the slide removed,

FIG. 3 a section the line III—III of FIG. 1,

FIG. 4 a cross section on the line IV—IV of FIG. 3,

FIG. 4a a cross section of another embodiment,

FIG. 5 an axial section of a second embodiment,

FIG. 6 a partial axial section of another mounting of the positioning spindle.

DETAILED DESCRIPTION

Figure 1:
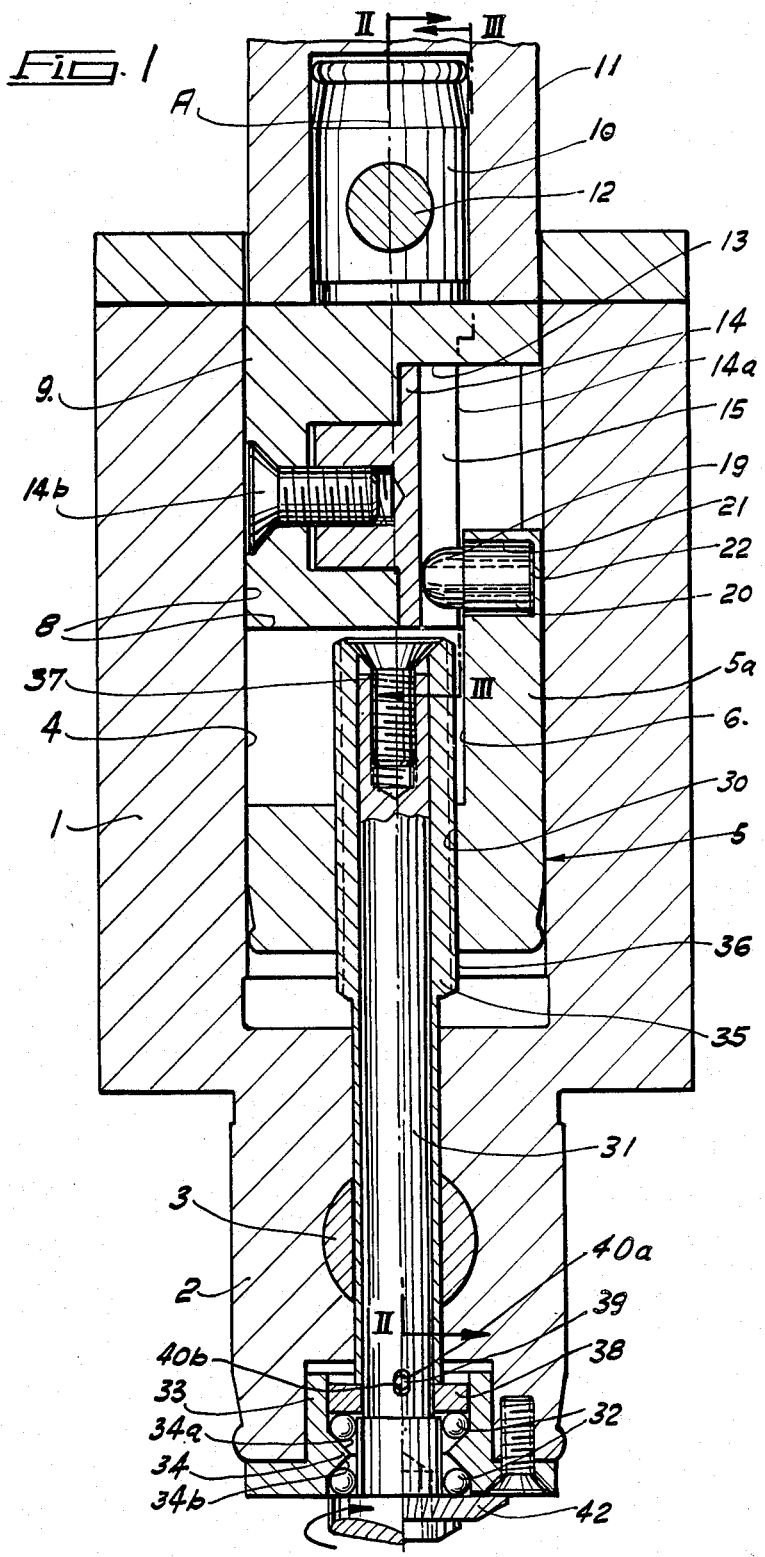
FIG. 1 a first embodiment in a first axial section on the line I—I of FIG. 3.

The substantially cylindrical housing 1 comprises a likewise cylindrical spigot 2 which can be connected directly or by way of an adaptor to the spindle, not shown, of a machine tool, especially a lathe. A coupling pin 3 is provided for locking the spigot 2 to the machine tool spindle or the adaptor and which cooperates with tightening screws, not shown, in the machine tool spindle or the adaptor in a manner similar to that shown in DE-PS 31 08 439.

The cylindrical housing 1 comprises a central bore 4 arranged coaxial to the housing axis A, in which a cylindrical body is slidable as the positioning member 5. The positioning member or cylindrical body 5 comprises, as is apparent from FIG. 1, a recess 6, whereby a forwardly projecting arm 5a is formed on the cylindrical body. A slide 9 is radially displaceable in a radially extending guide 8. The arm 5a extends over a part of this slide 9. The slide 9 comprises a cylindrical spigot 10, similar to the spigot 2. A tool holder 11 can be fitted on to the spigot 10 and tightened by means of a coupling pin 12 corresponding to the coupling pin 3. The cross slide 9 can equally well be provided with mountings for a tool carrier on its end surface 9a (FIG. 4).

In a stepped bore 13 there is recessed a disc 14 serving as the positioning element, held by the screw 14b. In the front face 14a of the disc 14 a groove 15 is worked. The disc 14 can be fixed in predetermined angular positions relative to the slide 9, which can be effected for example by a pin 16 which engages in a bore 17 in the slide and partially also in a semi-circular recess 18 or 18a of the disc 14. By altering the angle $\mu$ which the groove 15 makes with the housing axis A, one can alter the transmission ratio between the axially movable positioning member 5 and the radially movable positioning element or disc 14. If the angle of inclination amounts a to 26°34', as is shown in FIG. 3, then for an axial adjustment of the positioning member 5 of 1 mm, the slide is adjusted in the radial direction by 0.5 mm, which corresponds to a diameter variation of 1 mm. If the disc 14 is so rotated that the pin 16 engages in the recess 18a, as is shown in FIG. 5, then the groove 15 makes an angle $\mu1$ of 5°43' with the housing axis A. In this case the slide 9 is moved by 0.1 mm for an axial displacement of the positioning member 5 of 1 mm which corresponds to a variation of the working diameter of the tool of 0.2 mm. The maximum range of adjustment of the slide 9 naturally also alters in dependence upon the angle $\mu$ or $\mu1$. This range of adjustment is the larger the angle $\mu$. On the other hand, the adjustment accuracy can be enhanced by reducing the angle $\mu$, so that a large adjusting stroke of the positioning member 5 then corresponds only to a small adjustment stoke of the slide 9.

The groove 15 must have a cross section tapering towards the groove bottom 15a (FIG. 4). In this respect the groove 15 can have a semicircular cross section. An insert 19 engages in the groove and has a cross section corresponding to the cross section of the groove. The insert 19 is preferably hemispherical. The insert 19 is arranged on a cylindrical plug 20 which engages in a bore 21 extending perpendicular to the groove bottom 15a in the arm 5a of the positioning member 5. A coaxial positioning screw 22 can be screwed into the plug 20 and abuts at one end on the bottom 21a of the bore 21. The plug 20 with the insert 19 can be adjusted perpendicular to the groove bottom 15a by means of the positioning screw 22, which is accessible by way of a bore 23 in the insert 19, so that all play between the insert 19 and the groove 15 can be removed. When this is achieved, the plug 20 is advantageously fixed by means of a clamping screw 24 screwed into the arm 5a of the positioning member 5 tangentially to the peripheral surface of the plug, the clamping screw 24 engaging with a recess 24a against the peripheral surface of the plug 20. The clamping screw 24 is so arranged that, on tightening the same, a force is exerted on the plug by virtue of the friction between the peripheral surface and the recess 24, directed towards the bottom 21a of the bore 21. In this way it is ensured that the positioning screw 22 actually abuts the bore bottom 21a.

In order that the insert 19 shall not abut the groove bottom 15a but rather the side walls of the groove 15, the hemispherical insert 19 preferably has a flat 19a on its free end. In the embodiment shown this flat is formed in that the bore 23 is provided in the insert 19. The hemispherical formation of the insert 19 has the further advantage that the insert 19 always mates in the groove 15 whatever the angular position of the disc 14. On the other hand, if the insert has a trapezoidal form, as is shown in FIG. 4a, then on rotation of the disc 14, the plug 20 must also be rotated after releasing the clamping screw 24.

If desired the groove 15 could have a different cross section tapering towards the groove bottom. Thus, a groove 15' with a trapezoidal cross section is shown in FIG. 4a. The insert 19' is correspondingly also trapezoidal. If desired, the groove could also have a triangular cross section and the insert be correspondingly triangular. In the embodiment shown in FIG. 4a, the positioning screw 22 also abuts the bore bottom 21a. However, a bore 25 is provided in the arm 5a, through which a tool for turning the positioning screw 25 can be introduced. The cylindrical housing 1 is provided with a bore 26 through which the bore 25 is accessible in a predetermined position of the positioning member 5. The bore 26 can be closed by a screw, not shown, in order to protect the ingress of coolant, swarf and dirt.

Since the new precision adjustment head has the highest possible working accuracy it is important that the arm 5a of the positioning member 5 cannot deflect laterally. In order to ensure this, the arm 5a comprises two guide surfaces 27 extending perpendicular to the disc 9 and parallel to the housing axis A. A guide plate 28 engages without play against each guide surface 27. The freedom from play is achieved in that, during setting up, the guide plates 28 are pressed against the guide surfaces 27 and only then are the fixing screws 29 for the guide plates 28 tightened up.

In order to improve the sliding characteristics of the positioning member 5 and also the disc 14 relative to the parts cooperating therewith, it is advantaegous to make the positioning member 5 and also the disc 14 from cast bronze.

The axial adjustment of the positioning member 5 can take place in various ways. According to FIGS. 1 and 2, the positioning member 5 has a female thread 30. A positioning spindle 31 is rotatable in the housing 1 and is journalled without axial play by means of two axially stressed ball-bearings 32. A bush 33 is screwed into the spigot 2 of the housing, having an annular projection 34 with triangular cross section. The opposed side faces 34a or 34b of the annular projection inclined towards the positioning spindle axis or housing axis A form shoulders against which the ball-bearings 32 abut. A sleeve 35 having an external thread 36 is fitted over the positioning spindle 31 and engages with its external thread 36 the female thread 30. For pre-tensioning the two ball-bearings 32 serves the screw 37 which presses the sleeve 35 against the bearing disc 38. A transverse pin 39 which extends through a transverse bore of the positioning spindle 31 and engages in semicircular recesses 40a, 40b in the end surface of the sleeve 35 and the bearing disc 38 ensures that, on rotation of the positioning spindle 31, the sleeve 35 and the bearing disc 38 will also rotate therewith. The positioning spindle 31 and the sleeve 35 are passed through a longitudinal aperture 41 in the coupling pin 3.

The drive of the positioning spindle can be effected by a positioning rod, not shown, rotatably mounted in the machine tool spindle, which is driven for example from a stepping motor arranged in the machine tool spindle and is connected to the positioning spindle 31 by a releasable coupling. If desired an adjustment of the positioning spindle 31 could also be affected manually, before the housing 7 is coupled by way of its spigot 2 with the machine tool spindle. In this case a flange 42 with a graduated scale would be provided at the rear end of the positioning spindle 31.

According to FIG. 6 a mounting of the positioning spindle 31' free from axial play could also be achieved in that this comprises an annular projection 43 with triangular cross section. The ball-bearings 32 abut against the shoulders 43a and 43b of the annular projection, which are inclinded obliquely to the spindle or housing access A. By means of a nut 44 which is screwed into the bush 45, the ball-bearings 32 can be prestressed.

If the machine tool spindle has a hydraulic or electrically axially displaceable traction rod, the slightly modified embodiment of the precision adjustment head shown in FIG. 5 can be employed. Parts having the same function are indicated with the same reference numerals as in the above described embodiment and the explanations given thereto apply analogously. The embodiment shown in FIG. 5 differs from that previously described only in that an axially displaceable positioning rod 46 in the housing 1 is fixedly screwed to the positioning member 5. The traction rod, not shown, of the machine tool spindle engages with the positioning rod 46 by way of a suitable coupling.

The embodiments of the invention in which an exclusive property or privilege is claimed are defined as follows:

1. A precision adjustment head for a machine tool, especially a boring machine or the like, comprising a substantially cylindrical housing which can be connected to a spindle of a machine tool, a slide member radially displaceable in a radially extending guide of the housing on which a tool carrier can be fixed a positioning member axially displaceable in the housing and a positioning element fixed to the slide and having a groove running obliquely to the housing axis, said groove having a groove bottom forming base and sidewalls which divergingly taper away therefrom, said groove receiving therein a projecting insert provided on the positioning member and tapering at its free end in correspondence with the taper of the sidewalls of the groove, and wherein means are provided for adjusting and fixing said insert relative to the positioning member perpendicular to the groove bottom.

2. The precision adjustment head according to claim 1, wherein the insert is arranged on a cylindrical plug which is received in a bore in the positioning member extending perpendicular to the groove bottom.

3. The precision adjustment head according to claim 2, wherein a coaxial positioning screw is arranged in the plug and abuts a bottom of the bore.

4. The precision adjustment head according to claim 2, wherein the plug can be clamped by a clamping screw screwed into the positioning member tangential to the peripheral surface of the plug.

5. The precision adjustment head according to claim 1, wherein the groove bottom has a semicircular cross section and the insert is hemispherical.

6. The precision adjustment head according to claim 5, wherein the hemispherical insert has a flat at its free end.

7. The precision adjustment head according to claim 6, wherein the flat is formed where a central bore through the insert exits the insert adjacent the groove bottom.

8. The precision adjustment head according to claim 1, wherein the groove has a trapezoidal or triangular cross section and wherein the insert correspondingly tapers towards its free end in trapezoidal or triangular form.

9. The precision adjustment head according to claim 1, wherein the positioning member is a cylindrical body axially displaceable in a central axial bore in the housing, said cylindrical body having a recess at its front end for the slide member and a forwardly projecting arm on which is provided the bore for the plug.

10. The precision adjustment head according to claim 9, wherein the arm has two guide surfaces extending perpendicular to the slide member and parallel to the housing axis A, and wherein each guide surface is abutted by a guide plate without play, adjustable and fixable relative to the housing perpendicular to the guide surfaces.

11. The precision adjustment head according to claim 1, wherein the positioning element is a disc, in whose front face the groove is provided, the disc being set in a cylindrical recess of the slide member and being fixable in predetermined angular positions relative to the slide.

12. The precision adjustment head according to claim 11, wherein the disc consists of cast bronze.

13. The precision adjustment head according to claim 1, wherein the positioning member has a female thread in which engages a positioning spindle with an external thread centrally arranged in the housing and mounted rotatably without play by means of two axially stressed ball-bearings.

14. The precision adjustment head according to claim 13, wherein the two ball-bearings abut oppositely directed shoulders of an annular projection means provided on the positioning spindle, and wherein the annular projection means has a triangular cross section, its two side faces being oppositely inclined obliquely to the positioning spindle axis to form the two shoulders.

15. A precision adjustment head for a machine tool, in particular a boring machine or the like, comprising a substantially cylindrical housing which can be connected to a spindle of the machine tool, a slide member radially adjustable in a radially extending guide of the housing on which a tool carrier can be fixed, a positioning member axially displaceable in the housing and a positioning element arranged in a recess on the slide member and being secured thereto, said positioning element having a radially facing groove therein extending inclined with respect to an axis of the housing, into which groove is received a radially projecting insert provided on the positioning member and having an end conformed in its cross sectional shape to a cross sectional shape of the groove, said positioning element being in the form of a cylindrical disc, said recess being constructed cylindrically, and means for fixing the disc in the recess in selectively predetermined angular positions relative to the slide member.

16. The precision adjustment head according to claim 15, wherein the disc consists of cast bronze.

17. The precision adjustment head according to claim 15, wherein the insert is arranged on a cylindrical plug which is received in a bore in the positioning member extending perpendicular to a bottom of the groove.

* * * * *